United States Patent Office
3,010,023
Patented Nov. 21, 1961

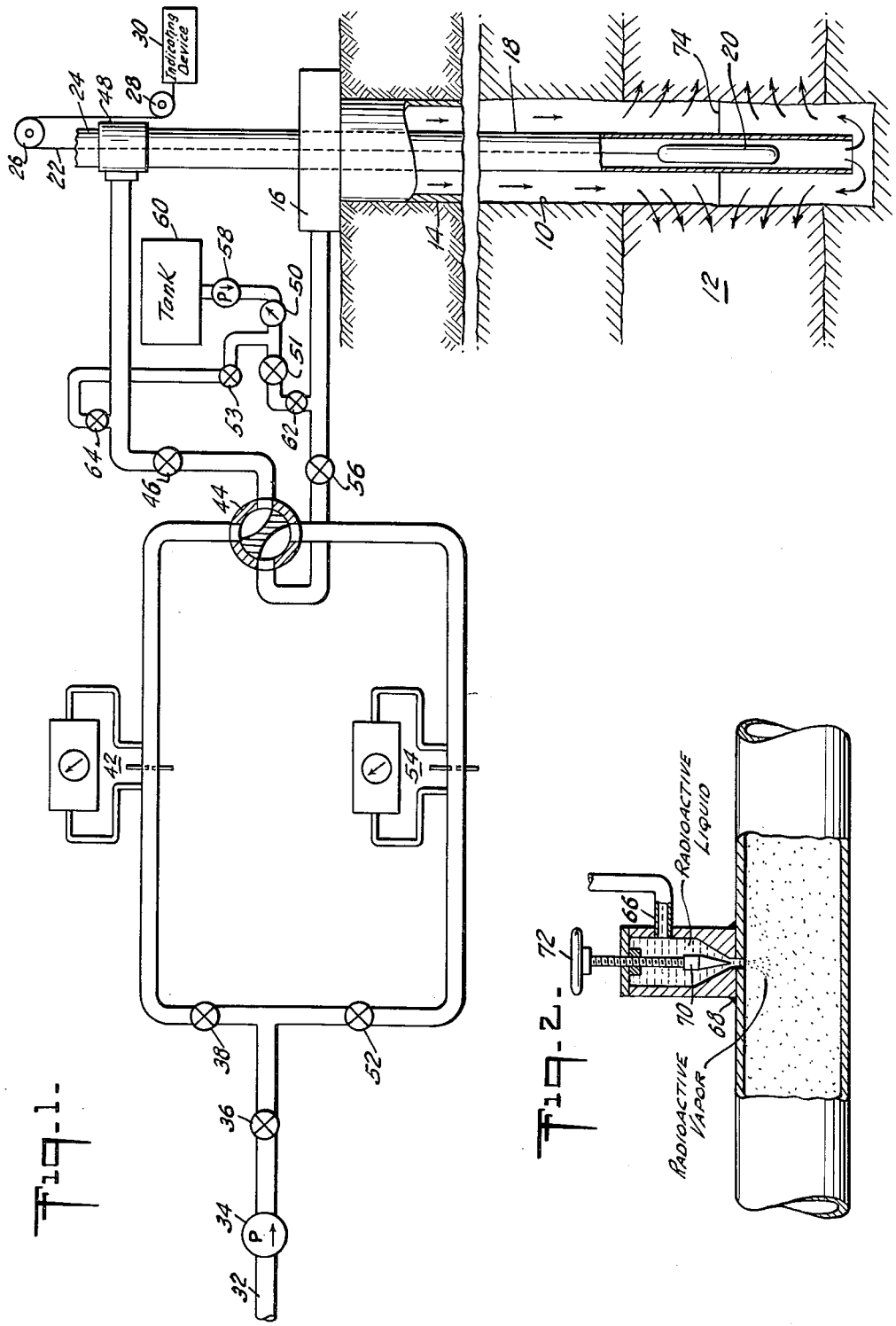

3,010,023
GAS INJECTIVITY PROFILE LOGGING
Edmond F. Egan, Richard H. Widmyer, and Alexander S. McKay, Houston, Tex., assignors to Texaco Inc., a corporation of Delaware
Filed Nov. 12, 1957, Ser. No. 695,903
14 Claims. (Cl. 250—106)

This invention relates to a method and apparatus for studying subsurface earth formations and more particularly to a method and apparatus for measuring the permeability of earth formations traversed by a well or borehole.

Knowledge of the permeability of subsurface formations in petroleum operations is of considerable importance. In secondary recovery operations for the production of oil from subsurface formations a fluid, for example water, oil or gas, is pumped into an injection well located at a point remote from an oil production well and directed into a given formation or vertical interval in the injection well to urge oil which may be contained therein toward the production well. In order to determine whether the fluid pumped into the injection well is being efficiently injected into the given formation the amount of fluid passing into various vertical increments of the wall of the injection well must be known. A log which indicates the vertical increments of the injection well into which fluid is entering and the amount of fluid flowing into each increment is sometimes referred to as an injectivity profile or permeability log of the well.

A method of obtaining an injectivity profile or permeability log of a well or a particular formation traversed by a borehole has been described in U.S. Patent 2,700,734 granted to Edmond F. Egan and Gerhard Herzog on January 25, 1955. In the patented method two streams of fluid are pumped into a well, one stream passing through a string of tubing extending downwardly to a point below the formation of interest and the other stream passing downwardly through the annular space between the tubing and the casing or the wall of the well. The streams are pumped simultaneously and each stream is carefully metered at the surface. The fluid pumped down through the tubing will, after filling the exposed portion of the well below the tubing, flow upwardly around the tubing until it meets the fluid pumped downwardly through the annular space, thus forming an interface between the two streams or bodies of fluid. In order to locate the interface between the two streams a small amount of tracer material, such as a radioactive substance, is added to one of the streams before it enters the well so that all of the fluid in this stream will be radioactive while the other stream will be non-radioactive. The depth in the well at which the interface lies may be readily located by lowering a detector, e.g. a radioactivity detector, into the wall and simultaneously and continuously recording the depth of the detector and the output signal therefrom. The response of the detector will change abruptly when the detector passes from the radioactive fluid into the non-radioactive fluid or vice versa.

In order to determine the amount of fluid that is entering into a vertical increment of the formation of interest the rates of injection or pumping of each of the two streams are varied but the sum of the rates are maintained constant. By changing the ratio of the amount of the radioactive fluid to the amount of non-radioactive fluid injected the interface will move to another depth in the well. The difference in the amount of either of the fluids injected into the well is the amount of fluid that is entering the vertical increment of the formation between the two interfaces. It can be seen that by making appropriate changes in the ratio of the amount of radioactive fluid to the amount of non-radioactive fluid pumped into the well the interface can be moved in a number of steps through the well past the formation of interest to provide an accurate log of the permeability of the formation, the length of each of the vertical increments between successive interfaces depending upon the amount of change of the rates of the two streams and upon the permeability of the increment. After each adjustment or change in the rates of the two streams the radiation detector is passed through the well and a record is made of the rates of the two streams and the depth of the interface. Accordingly it can be seen that in this manner an injectivity profile is made of a formation which clearly shows the permeability of the various vertical increments of the formation.

In accordance with this invention there is provided an improved method and apparatus for producing a gas injectivity profile log of a well. The method comprises supplying a gas stream under pressure to a conduit leading into the well and pumping an organic liquid solution of a radioactive organic compound through a flow regulating orifice into the gas stream in the conduit in a minor proportion by weight based on the weight of the gas, the organic liquid solution containing the radioactive organic compound being a liquid when in a sealed or enclosed container but both the organic liquid and the radioactive compound vaporizing rapidly when introduced into the flowing gas stream.

In order that the invention may be more clearly understood and readily carried into effect it will now be described more fully with reference to the accompanying drawing in which:

FIG. 1 is a vertical sectional elevation through a well illustrating apparatus for producing a gas injectivity profile log and FIG. 2 is a cross section of a type of flow regulating and atomizing needle valve which may be used in the apparatus illustrated in FIG. 1.

Referring to the drawing in more detail and particularly to FIG. 1, a well or borehole 10 is shown traversing several subsurface formations including the subsurface formation 12 for which it is desired to make a gas injection profile. The upper portion of the well is shown as being provided with a casing 14 having a closed casing head 16. A string of tubing 18 passes through the casing head 16 and downwardly through the well 10 to a point below the formation 12. Shown as suspended within the tubing 18 is a radioactivity logging instrument 20 containing a detector of gamma rays, the output of which is conducted upwardly through a conductor cable 22. The conductor cable 22 passes through the tubing 18 and a suitable well head lubricator shown in part at 24 and over a pulley 26 and a cable measuring drum or reel 28 which serves to indicate the amount of cable payed out and therefore the location of instrument 20 in the well 10. The upper end of the cable 22 is connected to a suitable indicating device 30, for example, a meter, oscilloscope or a recorder of the permanent type.

The gas supplied to the well 10 may be pumped from a gas supply line 32 by means of a suitable pump 34 through a main flow valve 36, for example a needle or gas regulator valve. The gas from the main flow valve 36 is then split into two streams, the first stream passing through a first proportioning or regulating needle valve 38, a first orifice meter 42, a 2-way valve 44, and a first shut-off valve 46 into the tubing 18 through a T 48, and the second stream passing through a second proportioning or regulating needle valve 52, a second orifice meter 54, the 2-way valve 44, and a second shut-off valve 56 into the annular space between the casing 14 and the tubing 18. A pump 58 connected to a tank or reservoir 60, preferably of a closed type, which contains a liquid tracer material, pumps the liquid through a suitable flow indicator 50, a shut-off valve 51 and a valve 62 which preferably may be adapted to atomize the liquid into the second gas stream before the gas enters the well. Alternatively, the pump 58 may be connected through the flow indicator 50 and a shut-off valve 53 to a second valve 64 when it is desired to introduce the liquid from tank 60 into the first gas stream. Since the liquid tracer material may not immediately completely vaporize in the stream at the outlet of the valve 62 the conduit or line conveying the gas stream between each of the first and second valves 62 and 64 and the well head should slope downwardly toward the well head so that any unvolatilized tracer solution will not flow upstream where it may be trapped, as for example, in a valve bottom. The sloping section of the line leading to the well head should be free of liquid traps.

A cross section of the type of valve which may be used for valve 62 or 64 is illustrated in more detail in FIG. 2. This valve, which is a needle valve, has an inlet 66 and a relatively small outlet 68, for example, ¼″ diameter, into which the needle 70 may be inserted by operating knob 72. Liquid is pumped through the inlet of this valve and remains in its liquid form until it passes through the outlet 68 where it is atomized and injected into the gas stream at a rate sufficient to produce a clearly identifiable interface 74 between the two gas streams in the well 10.

When making a gas injection survey wherein the tracer material is a radioactive substance, a natural gamma ray log of the borehole may be obtained before the radioactive substance is introduced into the well. This log serves as a base or reference line for comparison with future logs made during the survey. A base log is not necessary when the contrast between radioactive and non-radioactive gas is large or when the tubing stream is being tagged.

After this reference log is obtained the radioactive substance is injected into the gas stream which is being conducted into the annular space between the tubing 18 and the casing 14 until an interface is established at the top of the formation of interest. This interface is located by producing a radiation log of the hole with the radioactivity detector 20 and comparing this log with the original base or reference log, the lowest point of radioactivity increase indicates the radioactive-non-radioactive interface and thus locates the depth of the interface. Depending on the concentration of radioactive material in the tagged or marked gas in the annulus the point of increase in radioactivity over the natural background may stand out sharply enough so that a comparison with the reference log may not be necessary. Ordinarily if there is sufficient radioactivity in the tagged gas to give a reading from the detector of at least about three times the background value the interface will be clearly distinguishable without making a comparison with the reference log.

An injectivity profile is built up by a systematic incremental adjustment of the rates of flow of the gas streams, combined with a determination of the location of the interface between the radioactive and non-radioactive streams for each adjustment of the gas streams by the radioactivity detector 20. To move the interface in the downward direction, the flow of the non-radioactive gas which is being supplied to the tubing is reduced by about 10 percent and simultaneously the flow of the radioactive gas in the annulus is increased by the amount which the radioactive gas was decreased, thus to maintain a constant total flow into the well. Injection is maintained at these new rates until a stable condition is attained. The logging instrument 20 is then moved through the tubing 18 to locate the new position of the interface. As the ratio of radioactive gas in the annulus to non-radioactive gas in the tubing is increased, more of the permeable zone will be exposed to the injection of radioactive gas. Injection pressures encountered can range from a low of 20–25 p.s.i.a. to as high or higher than 5000 p.s.i.a. and the total volumes can range from 50 to 50,000 standard M c.f.d.

It is not necessary that the incremental change in flow rates follow any set arithmetical pattern. The incremental changes should be such that the results can be plotted in terms of percent input of the tagged stream against the borehole depth, the plotted points being spaced close enough together to present an accurate indication of the injectivity profile.

The selection of a suitable radioactive tracer material for tagging one of the two streams of gas is made on the basis of several factors, such as, (1) It should contain an economical gamma decay type radioactive isotope having a reasonably short half life; (2) It should be a liquid in order to facilitate handling and to permit the use of the same injection equipment which is used for liquid tracers in liquid injection surveys; (3) It should have fairly high vapor pressures at injection temperatures to facilitate vaporization in the gas stream but the vapor pressure should not be so high as to produce handling hazards; and (4) It should be soluble in a suitable diluent having approximately the same physical properties.

In accordance with an important feature of this invention it has been found that certain compounds of iodine 131, particularly ethyl iodide and methyl iodide, meet these isotope requirements. Ethyl alcohol has been found to be a suitable solvent and carrier liquid for ethyl iodide, and this combination is particularly suitable for tagging gas under normal conditions of temperature in temperate or warmer climates. Under certain conditions, for example, when tagging gas under low atmospheric temperature conditions, or when the gas is cold as results from passage through an expansion valve, it is desirable to use the combination of methyl iodide and methyl alcohol instead of the ethyl iodide-ethyl alcohol combination in accordance with the teachings of this invention.

Radioactive ethyl iodide is available on the market as a concentrated solution in ethyl alcohol which can be transported in a sealed container. The total volume of this concentrated tracer solution necessary to obtain a complete permeability log of a given formation may vary from, for example, about ¼ to 3 ounces providing from 5 to 50 millicuries of ethyl iodine. This total volume of concentrated tracer solution is mixed in the tank 60 with a much larger volume of ethyl alcohol, for example, about 2 to 4 gallons, before it is injected into one of the two streams which are introduced into the well.

The rate at which the tracer solution is injected into one of the two gas streams may be controlled by utilizing a calibrated vernier mechanism controlling the length of the piston stroke of the positive displacement pump 58. The flow indicator 50 may be used to provide a visual indication of tracer solution flow into the gas stream. When the gas stream which is directed into the annulus is to be tagged with the radioactive tracer material, shut-off valve 53 is in its closed position and shut-off valve 51 is in its open position to thus permit the tracer material to pass through the tracer material atomizing needle valve 62. When it is desired to tag the stream entering the well through the tubing 18 shut-off valve 51 is in its closed position and shut-off valve 53 is in its open position to permit the tracer material to pass through the tracer material atomizing needle valve 64. During the logging operation the rate of tracer solution injection is varied in a direct ratio with any changes in rate of the gas stream into which it is being fed so that the concentration of tracer material in the tagged stream is maintained constant.

Although ethyl iodide and methyl iodide compounds have been identified as suitable tracer materials it should be understood that any other radioactive tagging chemical may also be employed which is sufficiently volatile to vaporize readily in the gas stream to provide a uniform concentration of the desired amount of tracer, which has a very low solubility in fresh and salt water and which has low or negligible reaction with water.

In measuring the amount of gas flowing in the streams the accuracy of the meter readings is dependent upon the size of the orifice with respect to the gas flow rate and pressure. Generally, the variation of flow rate in gas injectivity logging covers too great a range to permit accurate readings with the use of a single orifice. To eliminate the need for changing orifice plates the apparatus of this invention, as illustrated in FIG. 1, includes switching means for readily interchanging the orifice meters 42 and 54 so that one meter measures rates only from 0 to 50 percent of the total flow of gas into the well and the other measures rates only from 50 to 100 percent. Thus, when the flow to the annulus constitutes 0 to 50 percent of the total gas, the low rate meter is connected to measure the amount of gas flowing to the annulus and the high rate meter is connected to measure the gas flowing to the tubing 18. However, when the flow rates are altered so that the gas flow to the annulus reaches 50 percent or more of the total gas, the meters 42 and 54 are switched merely by the operation of the 2-way valve 44. The high rate meter will then measure the flow of gas to the annulus and the low rate meter will measure the flow to the tubing 18. In this switching method the proportioning valve 38 at all times controls the amount of gas flowing through orifice meter 42 and the second proportioning valve 52 at all times controls the flow of gas measured by second orifice meter 54. The stream measured by the low rate meter is fed into the annulus when the stream being fed thereinto is 0 to 50 percent of the total gas and thereafter it is directed by 2-way valve 44 into the tubing 18. It should be understood that the functions of the valves 38 and 52 may be performed by utilizing a suitable single proportioning valve at the common point of origin of the first and second streams, i.e., at the junction point between valves 36, 38 and 52. It should also be understood that the switching function of the 2-way valve 44 may be performed by using other apparatus. When a two-way valve is not interposed in the conduit between the meters 42 and 54 and the shut-off valves 46 and 56, conduits each having a shut-off valve therein may be connected from the upstream sides of each one of to the downstream sides of each of the other of the shut-off valves 46 and 56.

Although in the description of the method which has been given it has been stated that the interface 74 is moved downwardly in increments along the wall of the formation 12 it is to be understood that the permeability log of the formation can be made upwardly as well as downwardly. Thus the interface 74 can be positioned first at or just below the lower boundary of the formation 12 and then the pumping rates of the two gases are changed by decreasing the rate of the stream pumped into the annulus and increasing the rate of the stream pumped into the tubing 18 by the same amount so that the interface 74 will move upwardly to a new position. This new position of the interface may then be found as has been described by moving the instrument 20 through the tubing 18. This operation may be repeated until the interface has reached a point at or just above the upper boundary of the formation 12. The resulting log obtained in this manner will be the same as a log obtained by moving the interface downwardly.

Although the radioactive gas has been described as being pumped down through the annular space between the tubing 18 and the walls of the well 10 and the non-radioactive gas through the tubing 18, it is to be understood that the paths of these gases can be interchanged, that is, the radioactive gas can be pumped down through the tubing and the non-radioactive gas through the annulus without affecting the process.

The apparatus illustrated in FIG. 1 shows that the two gas streams, that is, the radioactive and non-radioactive gas streams, are being pumped by one pump 34. It is to be understood that two pumps, one to pump the radioactive gas stream and the other to pump the non-radioactive gas stream, may be used.

Obviously, many modifications and variations of the invention as hereinabove set forth may be made without departing from the spirit and scope thereof and therefore only such limitations should be imposed as are indicated in the appended claims.

We claim:
1. In injectivity profile logging of a well, the method which comprises introducing a gas stream into the well and injecting an organic liquid solution of a radioactive organic compound in atomized form into the gas stream in a minor proportion by weight based on the weight of the gas, said organic liquid and said radioactive compound vaporizing rapidly in the flowing gas stream.

2. The method according to claim 1 wherein the radioactive compound is $RI_{131}$, where R is a lower alkyl.

3. In injectivity profile logging of a well, wherein a stream of gas is introduced into a well, the gas containing a radioactive material, and a radiation detector is moved through the well to determine flow characteristics of the gas stream, the method which comprises supplying the gas stream under pressure through a flow regulating valve to a conduit leading into the well, and pumping an organic liquid solution of a radioactive organic compound through a flow regulating orifice into the gas stream in said conduit in atomized form on the downstream side of said first mentioned flow regulating valve in a minor proportion by weight based on the weight of the gas, said organic liquid and the said radioactive compound vaporizing rapidly when in the flowing gas stream.

4. The method according to claim 3 wherein the said radioactive organic compound is $RI_{131}$, where R is a lower alkyl.

5. The method according to claim 4 wherein the organic liquid is selected from the group consisting of methyl and ethyl alcohol, and the R of the said radioactive organic compound $RI_{131}$ is selected from the group consisting of methyl and ethyl.

6. The method according to claim 3 wherein both the said organic liquid and the said radioactive organic compound are normally liquid at atmospheric temperatures and pressures and have boiling points under standard conditions above 50° C. and below 85° C.

7. The method according to claim 3 wherein the said organic liquid is ethyl alcohol, and the said radioactive organic compound is $CH_3CH_2I_{131}$ and is dissolved in ethyl alcohol in a proportion within the range of 0.01–5.0% by weight.

8. The method of making a log in a borehole which comprises pumping a gas into said borehole in a downward direction, simultaneously pumping another gas through said borehole in an upward direction so as to establish an interface between said gases, simultaneously pumping into one of said gases and atomizing an organic liquid solution of a radioactive organic compound in a minor proportion by weight based on the weight of said one gas, said organic liquid solution containing the said radioactive compound being a liquid under normal atmospheric temperatures and pressures, but both the organic liquid and the radioactive compound vaporizing rapidly when atomized into said one gas, determining the depth in the hole of said interface, varying the ratio of the rates of the two gases being pumped into the hole while maintaining constant the sum of the rates of the two fluids so as to cause said interface to move along the wall of said borehole to another depth, again determining the depth of the interface, and repeating these operations while noting the distance moved by the interface for each change in the ratio of the rates of the two gases being pumped into the borehole.

9. The method of making a permeability log of a subsurface formation traversed by a borehole containing a tubing extending down below said formation which comprises injecting a first stream of gas into the annular space between the tubing and the walls of the hole, simultaneously injection a second stream of gas into said borehole below said formation through said tubing, introducing an organic liquid solution of the radioactive compound in atomized form into one of said streams in a minor proportion by weight based on the weight of the gas in said one stream, said organic liquid and radioactive compound vaporizing rapidly when in said one gas stream, whereby an interface between the gases of said first and second streams is established, determining the depth in the hole of said interface by measuring the radioactivity of the gas content throughout that portion of the hole being examined, varying the ratio of the two gases being pumped into the hole while maintaining constant the sum of the two gases so as to cause the interface to move along the walls of said formations to another depth, determining again the depth of the interface by making another radioactivity measurement of the contents of the hole and repeating these operations while noting the ratios of the two gases of the streams for each measured depth of the interface in the borehole.

10. Apparatus for making a permeability log of a subsurface formation traversed by a borehole containing a tubing extending down below said formation in said borehole, comprising means for supplying first and second gas streams to said borehole, one of said gas streams being injected into said tubing and the other of said streams being injected into the annular space between said tubing and the wall of the borehole, gas measuring means including first and second orifice meters each having different ranges and adapted to measure the amount of gas in a different one of said streams and switching means for interchanging said meters with respect to said first and second gas streams, means for injecting a liquid tracer material into one of said streams in atomized form, and detecting means disposed in said borehole for determining the depth in the hole of the interface between the gases of the first and second streams.

11. Apparatus for making a permeability log of a subsurface formation traversed by a borehole containing a tubing extending down below said formation comprising a gas supply system including pumping means and a main control means, means for conveying first and second gas streams from said gas supply system into said borehole, said conveying means including first and second proportioning means, each of said proportioning means being adapted to regulate the flow of a different one of said gas streams, one of said gas streams being conveyed into the borehole through said tubing and the other of said streams being conveyed into the annular space between said tubing and the wall of the borehole, gas measuring means coupled to said conveying means and including first and second orifice meters each adapted to measure the amount of gas flowing in a different one of said streams and switching means for interchanging said first and second meters, means coupled to said conveying means for selectively introducing into one of said first and second streams a liquid tracer material in atomized form in a minor proportion by weight based on the weight of the gas of said one stream, said introducing means including a reservoir for storing an organic liquid solution of a radioactive organic compound, a needle valve disposed to discharge a vapor directly into one of the gas streams and means for pumping the liquid solution from said reservoir to said needle valve, and radioactivity detecting means disposed in said borehole for detecting the interface between said first and second streams.

12. Apparatus for making a permeability log of a subsurface formation traversed by a borehole containing a tubing extending down from said formation comprising a gas supply system including pumping means and a main control needle valve, means for conveying first and second gas streams from said gas supply system into said borehole, said conveying means including first and second proportioning needle valves, each of said proportioning needle valves being adapted to regulate the flow of a different one of said gas streams, one of said gas streams being conveyed into the borehole through said tubing and the other of said streams being conveyed into the annular space between said tubing and the wall of the borehole, gas measuring means including a low rate orifice meter and a high rate orifice meter each adapted to measure the amount of gas flowing in a different one of said streams and a 2-way valve for interchanging said meters, means including a needle valve coupled to said conveying means for selectively atomizing directly into one of said first and second gas streams a liquid tracer material in a minor proportion by weight based on the weight of the gas of said one stream, and detecting means disposed in said borehole for detecting the interface between said first and second streams.

13. Apparatus for making a permeability log of a subsurface formation traversed by a borehole containing a tubing extending down below said formation in said borehole comprising gas supply means for conducting first and second gas streams, said means including a proportioning means for controlling and an orifice meter for measuring the rate of flow of gas in each of the streams, one of said meters being a low rate meter and the other being a high rate meter, first and second means for conveying said gas streams into said tubing and into the annular space between said tubing and the wall of the borehole respectively, switching means interposed between said conducting means and said first and second conveying means for selectively directing said first and second gas streams into said first and second conveying means, means for selectively atomizing a liquid tracer material into one of said first and second gas streams and detecting means for determining the depth in the borehole of the interface between the gases of said first and second streams.

14. Apparatus for making a permeability log of a subsurface formation traversed by a borehole containing a tubing extending down below said formation in said borehole comprising first and second means for conducting first and second gas streams respectively, each of said conducting means including a proportioning device for controlling and an orifice meter for measuring the rate of flow of gas, first and second means for conveying said gas streams into said tubing and into the annular space between said tubing and the wall of the borehole respectively, means for selectively interconnecting said conducting means and said conveying means for the simultaneous flow of said gas streams through both of said last-mentioned means, means for selectively pumping a radioactive vapor into one of said first and second gas streams and radioactivity detecting means for determining the depth in the borehole of the interface between the gases of the first and second streams.

References Cited in the file of this patent

UNITED STATES PATENTS

| | | |
|---|---|---|
| 2,453,456 | Piety | Nov. 9, 1948 |
| 2,518,307 | Groebe | Aug. 8, 1950 |
| 2,631,242 | Metcalf | Mar. 10, 1953 |
| 2,700,734 | Egan et al. | Jan. 25, 1955 |
| 2,826,699 | Hull | Mar. 11, 1958 |